United States Patent [19]

Hafner

[11] Patent Number: 4,855,717

[45] Date of Patent: Aug. 8, 1989

[54] SECURITY DEVICE FOR CONVEYING SYSTEMS WITH UNMANNED VEHICLES

[75] Inventor: Rudolf Hafner, Nidau, Switzerland

[73] Assignee: JD-Technologie AG, Zug, Switzerland

[21] Appl. No.: 157,458

[22] Filed: Feb. 17, 1988

[30] Foreign Application Priority Data

Feb. 27, 1987 [CH] Switzerland ............................ 757/87

[51] Int. Cl.[4] ............................................. G08B 13/00
[52] U.S. Cl. ..................................... 340/556; 340/942;
250/221; 250/222.1; 180/167; 180/275
[58] Field of Search ............... 340/556, 557, 555, 942;
250/221, 225, 222.1; 180/274, 275, 277, 279,
168, 167, 169; 364/424.02; 356/364, 365, 369

[56] References Cited

U.S. PATENT DOCUMENTS

| | | | |
|---|---|---|---|
| 3,825,916 | 7/1974 | Steele et al. | 340/557 |
| 3,882,982 | 5/1975 | Smith | 250/222.1 |
| 4,049,961 | 9/1977 | Marcy | 180/169 |
| 4,097,733 | 6/1978 | Langenbach et al. | 250/221 |
| 4,156,883 | 5/1979 | Walter et al. | 340/556 |
| 4,339,660 | 7/1982 | Buchholz et al. | 250/221 |
| 4,516,115 | 5/1985 | Frigon et al. | 340/556 |
| 4,549,182 | 10/1985 | Gillet | 340/942 |
| 4,605,850 | 8/1986 | Anselment et al. | 340/556 |
| 4,653,002 | 3/1987 | Barry | 340/942 |
| 4,727,492 | 2/1988 | Reeve et al. | 364/424.02 |
| 4,736,098 | 4/1988 | Rehrig | 250/222.1 |

FOREIGN PATENT DOCUMENTS

| | | |
|---|---|---|
| 3501598 | 7/1986 | Fed. Rep. of Germany . |
| 0233005 | 2/1985 | German Democratic Rep. ................................ 340/556 |
| 57197619 | 12/1982 | Japan . |
| 0019784 | 1/1987 | Japan .............................. 250/222.1 |
| 0984398 | 2/1965 | United Kingdom ............... 340/556 |
| 2028647 | 3/1980 | United Kingdom . |

Primary Examiner—Joseph A. Orsino
Assistant Examiner—Jill D. Jackson

[57] ABSTRACT

A security device for monitoring unmanned vehicles within an area, the device comprising at least two oppositely directed light barriers associated with the area. Each light barrier includes a light emitter, a reflector, and a light receiver. The light barriers are disposed such that their light-beams are interrupted by the vehicles entering the area. Reflectors are arranged laterally on authorized vehicles, thereby making them undetectable by the security device. Another embodiment uses the light barriers attacted to the vehicle such that unauthorized objects will cause the vehicle to stop.

8 Claims, 2 Drawing Sheets

SECURITY DEVICE FOR CONVEYING SYSTEMS WITH UNMANNED VEHICLES

BACKGROUND OF THE INVENTION

1. Field of the Invention

The present invention relates to a security device for conveying systems with unmanned vehicles. More specifically, this invention is directed to a security device for detecting objects in the path of an unmanned vehicle or persons entering a certain area which is reserved for vehicles only.

2. Description of the Prior Art

Conventional security devices for preventing unmanned vehicles to collide with objects (e.g. persons), usually consist of mechanical constructions protruding on the exterior of the vehicle and covering at least the width of its path (such as bumpers). Deformation of this security device causes an emergency stop of the vehicle.

In conveying systems, transport vehicles have to cooperate with stationary support structures, in order to pick up or deposit their load. Yet, very often such cooperation has proved difficult or even impossible since the security device collides with these support structures before the vehicle is close enough to the latter. Adapting the construction of the support structures is not always possible or would result in other shortcomings.

In such cases, the aforementioned security devices have to be deactivated, which usually entails closing of the load delivery areas for all other traffic, especially persons. Often however, this is incompatible with the idea of the conveying system, which, e.g. in the case of flexible assembly lines, consists precisely in a close linkage of automatic transport and manual work.

Other conventional solutions, such as proposed by DE-A 3 501 598, wherein persons working in the conveying area wear helmets or/and belts with integrated infrared emitters and the vehicles are equipped with corresponding infrared detectors, bear apparently similar shortcomings regarding the desirable close linkage man/vehicle.

In automatic conveying systems it is further required that certain areas, paths or places used by unmanned vehicles are provided with security systems which cause the traffic to stop if a person enters the protected area.

Generally known security devices of this kind comprise several stationary light barriers in succession. The distance between the first and the last of these light brriers is chosen such that a vehicle is capable of interrupting all of them at the same time, whereas persons are detected because they interrupt only a limited number of related light barriers.

Yet such a security device is not capable of detecting a person walking at the side of a vehicle or carrying an object of about the length of a vehicle (e.g. a board or a plate).

SUMMARY OF THE INVENTION

An object of the present invention, therefore, is to provide an improved security device for unmanned vehicles, for monitoring the front area of their path and being capable of distinguishing two types of objects: objects, which have to cause an emergency stop of the vehicle, and objects, which have to be ignored.

Another object of the invention is to provide an improved security device for conveying systems, for reliably detecting persons entering certain areas, which are reserved to unmanned vehicles only.

A further object is to provide a security device for conveying systems with unmanned vehicles, for monitoring a given area, comprising at least two oppositely directed light barriers, each of them comprising means for emitting a light-beam, means for reflecting this light-beam and means for receiving the reflected light beam. The light barriers are disposed such that their light-beams are interrupted by an object entering the given area. Objects which are allowed to enter the given area are provided with lateral means for reflecting the light-beam.

BRIEF DESCRIPTION OF THE DRAWINGS

The invention will be better understood and objects other than those set forth above, will become apparent when consideration is given to the following detailed description thereof. Such description makes reference to the annexed drawings wherein.

DESCRIPTION OF THE PREFERRED EMBODIMENTS

Figure 1:
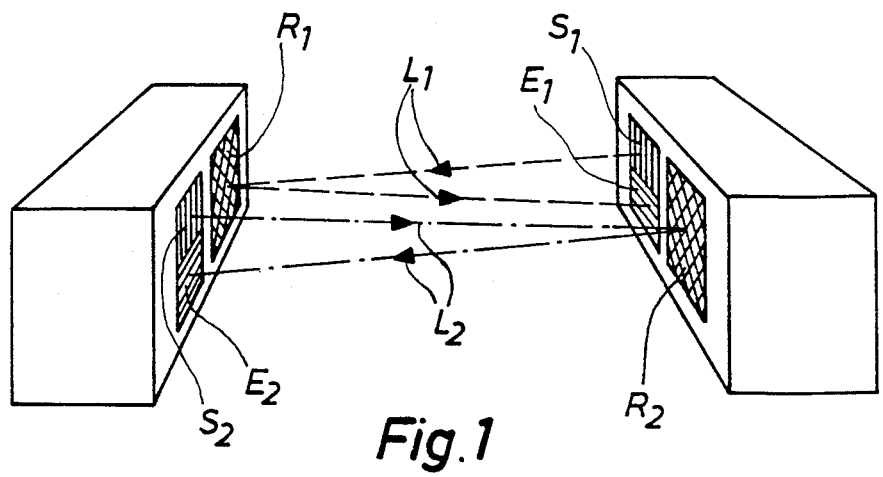
FIG. 1 is a perspective view of the basic arrangement of the light barriers.

Referring to FIG. 1, there is shown a prespective view of an arrangement of two oppositely directed light barriers. Each of these light barriers comprises an emitter $S_1$, $S_2$, emitting a respective light-beam $L_1$, $L_2$, and further a receiver $E_1$, $E_2$ and a reflector $R_1$, $R_2$. The light-beams $L_1$, $L_2$ are reflected to the respective receivers $E_1$, $E_2$ by menas of the reflectors $R_1$, $R_2$.

To avoid any mutual influence of the two light barriers, emitters and receivers are provided with polarization filters, such that the polarization axis of the emitter filters are disposed vertically with respect to the polarization axis of the receiver filters. Therefore, the light barriers $S_1$—$R_1$—$E_1$, $S_2$—$R_2$—$E_2$ work only, if the reflectors $R_1$, $R_2$ are so-called triple-reflectors, i.e. reflectors which change the direction of polarization of the reflected light-beam. Such reflectors are best known in the art. They consist for instance of foil strips with an inner structure of triple-prisms of sub-millimeter size (e.g. reflector No. 4.096 03 made by Visolux-elektronik, Berlin).

At the same time there results another advantage, in that an interruption of the light-beam $L_1$, $L_2$ by usual light-reflecting objects (for instance shining metal surfaces) is detected by the light barriers.

Figure 2:
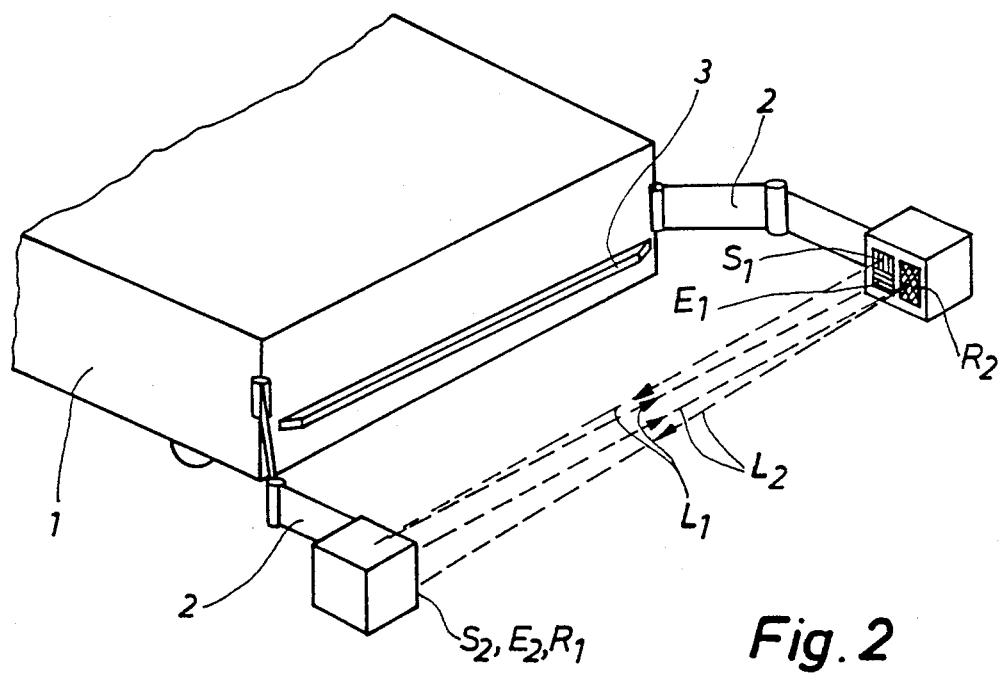
FIG. 2 is a perspective view of a vehicle, equipped with a possible light barrier arrangement.

FIG. 2 illustrates an unmanned vehicle 1 equipped with a possible arrangement of a security device. Two oppositely directed light barriers, corresponding to those of FIG. 1, are mounted on the front side of the vehicle 1 by means of two articulated arms 2. The arms 2 swivel in case of contact, so that at least one reflector leaves the range of its associated emitter-receiver thus triggering an emergency stop of the vehicle. This also happens if an object interrupts at least one of the light-beams $L_1$, $L_2$. In addition a deformable security ledge 3 is provided in front of the vehicle 1. An object which already is between the light-beams $L_1$, $L_2$ and the vehicle when the latter starts, causes an emergency stop on contacting the ledge 3. Therefore the vehicle's speed has to be kept low at the beginning of its travel to ensure that the vehicle comes to a stop within the deformation range of the ledge 3.

Figure 3:
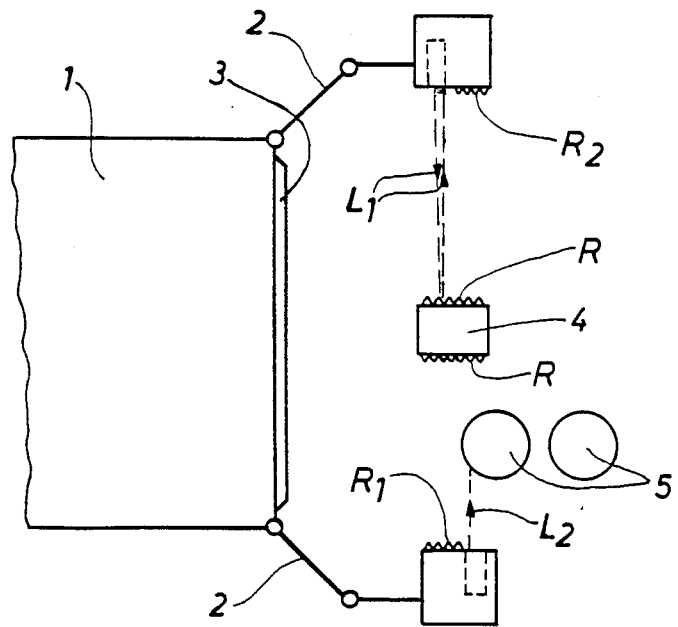
FIG. 3 is a schematic top view to illustrate the mode of operation of the security device.

FIG. 3 explains the function of the security device by showing a vehicle 1 (corresponding to the one of FIG. 2), a first object 4, which must not cause an emergency stop of the vehicle 1 and a second object 5, which has to cause an emergency stop. The object 4 (e.g. a post of a stationary support structure) is provided on both sides with triple-reflectors R. The light-beam $L_1$ of the emitter $S_1$, instead of being reflected to the receiver $E_1$ by the reflector $R_1$, isreflected by the reflector R. Without the presence of the second object 5, the same would apparently happen with the light-beam $L_2$. The first object 4 cannot be detected by the security device. On the other hand, the second object 5 (e.g. a person) is detected by the security device because the light-beam $L_2$ is not reflected on the receiver $E_2$, which leads to an emergency stop of the vehicle.

Figure 4:
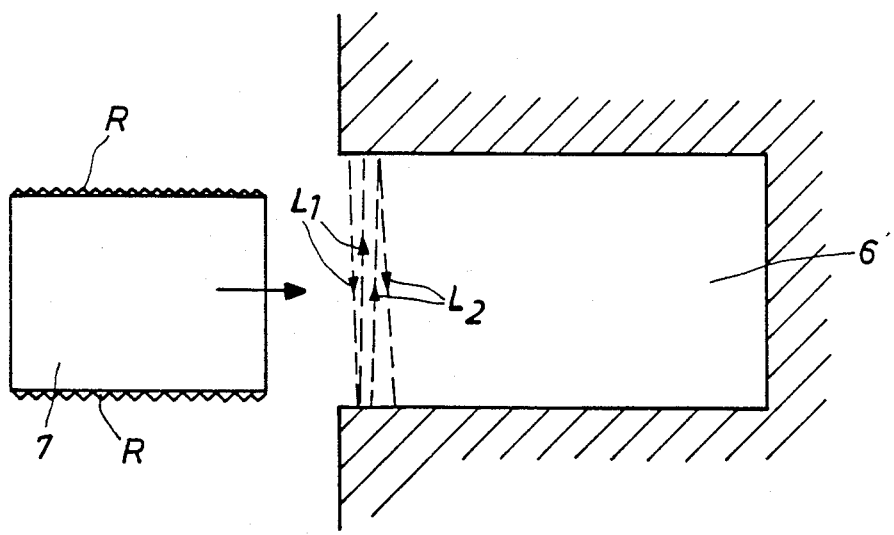
FIG. 4 is a top view of an stationary area equipped with the security device.

Obviously, instead of monitoring the area in front of a vehicle, the same security device can be used to monitor a stationary area 6, as represented in FIG. 4. The two light barriers are mounted on both sides of the entrance of the area 6 (for instance 50 cm above floor level). The light-beams $L_1$, $L_2$ are interrupted, at least momentarily, by a person entering the area 6, thus causing an alarm or stopping any vehicle movement in this area until the person has left the area.

Vehicles which are allowed to enter the area 6 are provided with lateral reflectors R, thereby reflecting the light-beams $L_1$, $L_2$ on their associated receivers $E_1$, $E_2$ when entering the area 6. Such vehicles are "invisible" to the security device.

While there are shown and described present preferred embodiments of the invention, it is to be distinctly understood that the invention is not limited thereto, but may be otherwise variously embodied and practiced within the scope of the following claims.

I claim:

1. In a conveying system employing driverless vehicles a security device for monitoring a given area, said area having an entrance zone laterally defined by left and right monitoring stations, said device comprising:

mutually facing first and second light barriers, one located at each monitoring station, each barrier comprising a light emitter, a light receiver and a light reflector, the light emitter of said first barrier being arranged to direct a first light beam across said entrance zone toward the reflector of said second barrier and the reflector of said second barrier being arranged to reflect said first light beam back to the receiver of said first barrier, the light emitter of said second barrier being arranged to direct a second light beam across said entrance zone in the opposite direction to that of said first beam toward the reflector of said first barrier and the reflector of said first barrier being arranged to reflect said second light beam back to the receiver of said second barrier, whereby both beams will be interrupted by unauthorized objects entering said area through said entrance zone, and third light reflectors for reflecting said light beams arranged laterally on authorized objects allowed to enter said area through said entrance zone between said monitoring stations.

2. The security device according to claim 1 wherein each of said light emitters is provided with a first polarization filter having a first polarization axis; and each of said light receivers is provided with a second polarization filter having a second polarization axis, said first and second polarization axis at each light barrier being disposed substantially vertically to each other.

3. The security device according to claim 1 wherein said light reflectors are triple-reflectors.

4. The security device according to claim 1 wherein said area is reserved for said driverless vehicles with at least one entrance zone for said driverless vehicles, wherein said driverless vehicles, provided with third light reflectors, comprise authorized objects allowed to enter said area.

5. A driverless vehicle having a security device arranged at least at its front side for monitoring a given area in front of the vehicle and operative for triggering an emergency stop of the vehicle, said area having an entrance zone laterally defined by left and right monitoring stations, said device comprising:

mutually facing first and second light barriers, one located at each monitoring station, each barrier comprising a light emitter, a light receiver and a light reflector, the light emitter of said first barrier being arranged to direct a first light beam across said entrance zone toward the reflector of said second barrier and the reflector of said second barrier being arranged to reflect said first light beam back to the receiver of said first barrier.

the light emitter of said second barrier being arranged to direct a second light beam across said entrance zone in the opposite direction to that of said first beam toward the reflector of said first barrier and the reflector of said first barrier being arranged to reflect said second light beam back to the receiver of said second barrier, whereby both beams will be interrupted by unauthorized objects entering said area through said entrance zone, and third light reflectors for reflecting said light beams arranged laterally on objects which must not cause an emergency stop of said vehicle when entering said area through said entrance zone between said monitoring stations.

6. The driverless vehicle according to claim 5, wherein said first and second light barriers are mounted on said vehicle by means of articulated, swivelling arms.

7. The driverless vehicle according to claim 5, further comprising a deformable security ledge on said vehicle operative for triggering an emergency stop of the vehicle in case of physical contact, said security ledge being mounted within said given area at least at the front side of said vehicle.

8. In a conveying system employing driverless vehicles, a security device for monitoring a given area and detecting unauthorized objects while permitting the entry of authorized objects, said area having an entrance zone laterally defined by left and right monitoring stations, said device comprising:

mutually facing first and second light barriers, one located at each monitoring station, each barrier comprising a light emitte,r a light receiver and a light reflector, the light emitter of said first barrier being arranged to direct a first light beam across said entrance zone toward the reflector of said second barrier and the reflector of said second barrier being arranged to reflect said first light beam back to the receiver of said first barrier, The light emitter of said second barrier being arranged to direct a second light beam across said entrance zone in the opposite direction to that of said first beam toward the reflector of said frist barrier and the reflector of said first barrier being arranged to reflect said second light beam back to the receiver of said second barrier, whereby both beams will be interrupted by unauthorized objects entering said area through said entrance zone, whereby the entrance into said area of unauthorized objects will trigger said security device by interrupting said light beams but the entrance thereinto of authorized objects provided with laterally arranged light reflectors for reflecting said light beams back to said light receivers will not do so.

* * * * *